(12) United States Patent
Sumitomo

(10) Patent No.: US 9,415,723 B2
(45) Date of Patent: Aug. 16, 2016

(54) IMAGE INTEGRATION UNIT AND IMAGE INTEGRATION METHOD

(75) Inventor: Hironori Sumitomo, Moriguchi (JP)

(73) Assignee: KONICA MINOLTA HOLDINGS, INC., Tokyo (JP)

(*) Notice: Subject to any disclaimer, the term of this patent is extended or adjusted under 35 U.S.C. 154(b) by 1058 days.

(21) Appl. No.: 13/258,974

(22) PCT Filed: Mar. 31, 2009

(86) PCT No.: PCT/JP2009/056590
§ 371 (c)(1),
(2), (4) Date: Sep. 22, 2011

(87) PCT Pub. No.: WO2010/113239
PCT Pub. Date: Oct. 7, 2010

(65) Prior Publication Data
US 2012/0013713 A1    Jan. 19, 2012

(51) Int. Cl.
*B60R 1/00*    (2006.01)
*G06T 7/20*    (2006.01)

(52) U.S. Cl.
CPC ............... *B60R 1/00* (2013.01); *G06T 7/2033* (2013.01); *B60R 2300/107* (2013.01); *B60R 2300/30* (2013.01); *G06T 2207/10021* (2013.01); *G06T 2207/20048* (2013.01); *G06T 2207/30252* (2013.01)

(58) Field of Classification Search
CPC .......... H04N 13/0007; H04N 13/0037; H04N 2013/0074; H04N 2013/0092; G06T 2207/30252; G06T 7/2033; G06T 2207/10021; G06T 2207/20048; G06T 7/004; B60R 1/00; B60R 2300/107; B60R 2300/30; B60R 2300/303
See application file for complete search history.

(56) References Cited

U.S. PATENT DOCUMENTS 5,668,631 A    9/1997    Norita et al.
6,243,165 B1    6/2001    Norita et al.
(Continued)

FOREIGN PATENT DOCUMENTS

JP    7-174538 A    7/1995
JP    7-334800 A    12/1995
(Continued)

OTHER PUBLICATIONS

International Search Report in International Application No. PCT/JP2009/071248, mailed Feb. 2, 2010, 1 page.
Supplementary European Search Report in European Patent Application No. 09 84 2595.2, dated Jul. 24, 2014, 7 pages.
Yang, Cheng, et al., "Visual Odometry on the Mras Exploration Rovers," dated Oct. 20, 2004, Systems, Man and Cybernetics, 2005, IEEE International Conference, IEEE, Piscataway, New Jersey, USA, pp. 903-910.
(Continued)

*Primary Examiner* — Geepy Pe
(74) *Attorney, Agent, or Firm* — Brinks Gilson & Lione

(57) ABSTRACT

An image integration unit includes: an imaging section which is installed in a moving body and which images a plurality of time-series images at different times; a three-dimensional image information calculating section which calculates three-dimensional image information in each of the time-series images based on the time-series images imaged by the imaging section; a stationary body area extracting section which extracts stationary body areas in each of the time-series images based on the three-dimensional image information; and an integrating section which calculates the corresponding stationary body areas between the time-series images from each of the stationary body areas extracted in each of the time-series images, and matches the corresponding stationary body areas to integrate the time-series images.

20 Claims, 8 Drawing Sheets

(56) References Cited

U.S. PATENT DOCUMENTS

| | | | |
|---|---|---|---|
| 6,396,535 | B1 | 5/2002 | Waters |
| 6,407,817 | B1 | 6/2002 | Norita et al. |
| 6,993,159 | B1 * | 1/2006 | Ishii et al. ............... 382/104 |
| 2001/0043335 | A1 | 11/2001 | Norita et al. |
| 2002/0131056 | A1 | 9/2002 | Fujii et al. |
| 2002/0159072 | A1 | 10/2002 | Fujii et al. |
| 2003/0137674 | A1 | 7/2003 | Norita et al. |

FOREIGN PATENT DOCUMENTS

| | | |
|---|---|---|
| JP | 2000-244897 A | 9/2000 |
| JP | 2004-102426 A | 4/2004 |
| JP | 2006-134035 A | 5/2006 |
| WO | WO 2004-008744 A1 | 1/2004 |

OTHER PUBLICATIONS

Franke, Uwe, et al., "Autonomous Driving Goes Downtown," dated Jan. 1, 1998, IEEE Intelligent Systems, IEEE Service Center, New York, New York, USA, pp. 40-48.

Lindner, F., et al., "Robust Recognition of Traffic Signals," dated Jun. 14, 2004, Intelligent Vehicles Symposium, 2004 (IEEE Parma, Italy, Piscataway, New Jersey, USA, pp. 49-53.

Szeliski, R., et al., "Direct Methods for Visual Scene Reconstruction," dated Jun. 24, 1995, Representation of Visual Scenes, 1996. (In conjunction with ICCV '95.), Proceedings IEEE Workshop on Cambridge, Massachusetts, USA, Los Alamitos, CA, USA, IEEE Comput. Soc., U.S., pp. 26-33.

* cited by examiner

IMAGE INTEGRATION UNIT AND IMAGE INTEGRATION METHOD

This application is the National Stage Application of International Patent Application No. PCT/JP2009/056590, filed Mar. 31, 2009.

TECHNICAL FIELD

The present invention relates to an image integration unit and an image integration method for integrating time-series images.

BACKGROUND ART

Recently research on various systems for improving safety is ongoing in the automobile industry. In particular, a crisis avoidance system using an image sensor having an imaging apparatus has been developed. Specifically, a system which specifies an obstacle around a vehicle and which analyzes the movement of the obstacle based on images imaged by the imaging apparatus, whereby the vehicle avoids the obstacle, has been developed.

A system which extracts various information that is useful for investigating a cause of an accident by analyzing images before and after the accident has also been developed for cases when a crisis could not be avoided and an accident occurred. For example, Patent Document 1 discloses a system which obtains images before and after an accident using an imaging apparatus disposed at an intersection, and analyses the situations during the accident, such as the speed of a vehicle which caused the accident by analyzing these images. In this system, a plan view data, which is a data including only such stationary objects as a road surface and a crosswalk at an intersection of the accident site, is provided in advance, and images during the accident are projected on this plan view data, so as to analyze the situations of the accident. It is preferable to obtain three-dimensional information for analyzing the conditions of the accident. For example, three-dimensional information can be obtained by analyzing images input from many different angles, and it is useful to analyze the situations of the accident based on the three-dimensional information is useful. Patent Document 2, for example, discloses a technology which respectively transforms the coordinates of image data which are input from many different viewpoints, and connects them so as to be easily integrated into three-dimensional information.

The technology disclosed in Patent Document 1 can support only analyzing the situations of an accident at a location where a stationary camera, that is, an image apparatus, is installed, and of which the plan view data is provided in advance, therefore only accidents which occurred in predetermined locations can be handled. This means that the technology disclosed in Patent Document 1 cannot be applied to a camera installed on a vehicle, which is a moving body. The technology disclosed in Patent Document 2 is not a technology assuming the use for analyzing the situations of an accident, and can obtain only three-dimensional information of a stationary body. Therefore in the case of the technology disclosed in Patent Document 2, it is difficult to obtain three-dimensional information of a moving body, such as a vehicle and a pedestrian, even if three-dimensional information of such stationary bodies as a road surface, traffic lights and traffic signs, can be obtained.

Patent Document 1: Japanese Patent Application Laid-Open No. 2004-102426

Patent Document 2: Japanese Patent Application Laid-Open No. H7-174538

SUMMARY OF THE INVENTION

With the foregoing in view, it is an object of the present invention to provide an image integration unit and image integration method, which can integrate time-series images imaged while moving, at high precision.

The image integration unit of the present invention extracts a stationary body area from each time-series image, and integrates the time-series images by matching the corresponding stationary body areas between the time-series images. Thereby the time-series images, including the images of moving bodies and stationary bodies, can be accurately integrated.

BRIEF DESCRIPTION OF THE DRAWINGS

FIG. 3 are diagrams depicting a case of an operator selecting stationary body areas, where

FIG. 8 are diagrams depicting integrated images according to an embodiment of the present invention, where

BEST MODE FOR CARRYING OUT THE INVENTION

Figure 1:
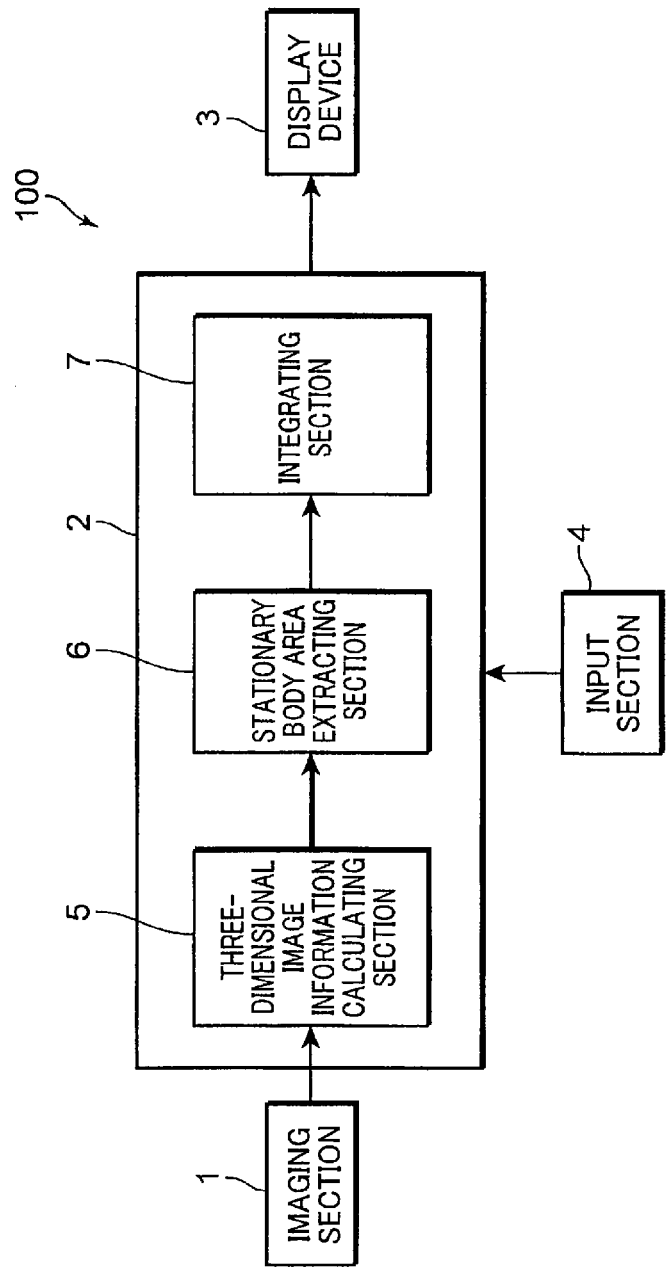
FIG. 1 is a block diagram depicting a configuration of an image integration unit according to an embodiment of the present invention.

An embodiment of the present invention will now be described with reference to the drawings. In each drawing, composing elements denoted with a same reference numerals are a same composing element, and redundant description thereof is omitted.

First a configuration of an image integration unit according to an embodiment of the present invention will be described. FIG. 1 is a block diagram depicting the configuration of the image integration unit according to an embodiment of the present invention. As FIG. 1 shows, the image integration unit 100 is provided with an imaging section 1, a processing section 2, a display device 3, and an input section 4. The imaging section 1 is installed in such a moving body as a vehicle, and obtains time-series images. The imaging unit 1 is a camera having such a image sensor as a CCD (Charge-Coupled Device). The imaging section 1 is preferably a stereo camera constituted by two cameras, which are disposed at the left and right with an appropriate distance there between. Thereby the image integration unit 100 can obtain three-dimensional image information of the images imaged by the imaging section 1. Here the left camera and the right camera of the stereo camera image an object at the same timing, and obtain a left image and a right image as a pair. It is preferable that aberrations of the left and right cameras are corrected well, and the left and right cameras are installed parallel to each other. If the cameras of the stereo camera are installed in parallel, parallel images are obtained. The three-dimensional image information refers to three-dimensional coordinates with respect to a position of the camera as a reference, and to two-dimensional and three dimensional motion vectors or the like, which can be obtained from the stereo time-series images.

The processing section 2 is constituted by various electronic components, integrated circuit components, a CPU (Central Processing Unit) and a storage unit, among others. The storage unit is constituted by a ROM (Read Only Memory) for storing control programs of the image integration unit 100, an EEPROM (Electrically Erasable Programmable ROM), a RAM (Random Access Memory), and such a non-volatile memory as a flash memory for temporarily storing images imaged by the imaging section 1. The processing unit 2 comprises a three-dimensional image information calculating section 5, a stationary body area extracting section 6, and an integrating section 7. The three-dimensional image information calculating section 5 calculates three-dimensional image information in each image based on the time-series stereo images imaged by the imaging section 1. In concrete terms, the three-dimensional image information calculating section 5 determines three-dimensional coordinates of points on the image and optical flow. Technologies for obtaining three-dimensional image information (e.g. three-dimensional coordinates, optical flow) of an image based on time-series stereo images are publically known. In concrete terms, the three-dimensional image information of an image is obtained by searching points corresponding to the points on an image in an image corresponding to the image (corresponding point search). For example, three-dimensional coordinates at the time are obtained by performing the corresponding point search between a pair of stereo images. The optical flow of the points is determined, for example, by performing the corresponding point search between the images imaged by a same camera at different imaging times. If the imaging section 1 is not a stereo camera but a monocular camera, the image integration unit 100 may have an apparatus which can perform three-dimensional measurement, such as a measuring instrument using laser or millimeter waves. Then the three-dimensional image information calculating section 5 can obtain three-dimensional image information by correlating the measured values of the measuring instrument and time-series images imaged by the monocular camera.

The corresponding point search will now be described. A correlation method is a method for searching and determining points (corresponding points) on a reference image corresponding to arbitrary target points on a standard image. The reference image is an image corresponding to the standard image. In concrete terms, in the case of stereo images, one of a pair of images imaged at a same time is a standard image, and the other is a reference image. In the case of time-series images, a preceding image, out of the images imaged by a same camera, is the standard image, and a following image is the reference image. A template is set for the target points on the standard image, and a window corresponding to the template is searched on the reference image, and corresponding points are determined in this searched window.

A concrete corresponding point search will now be described. One of the images imaged by the imaging section 1 is regarded as a standard image, target points are set on the standard image, and a template, including the target points, is set on the standard image. Here a template is a range of a predetermined limited area, and has information (image patterns) in this range, such as a brightness value of each pixel. Then correlation values (degrees of similarity) between this template and a plurality of windows, which are set in the reference images corresponding to the standard image, are calculated, and based on the correlation values, it is determined whether the template and the windows are corresponded. Windows are a plurality of areas generated on a reference image, each of which has a same size of range as the template, and has information (image patterns) in this range, such as a brightness value of each pixel. The correlation values are determined based on the image patterns between the template and the windows, as mentioned above. For example, a correlation value between the template and one of the windows is determined, and if it is determined that these do not correspond to each other by a low correlation value, a correlation value between the template and a window generated in a position shifted by one pixel from the above mentioned window in any direction is determined, for example. In this way, correlation values are determined while sequentially changing windows, and a window of which correlation value is a peak value, that is a window which corresponds to the template, is determined.

Such a method for the corresponding points search is publically known, and various methods have been proposed. For example, various methods for shortening time to determine a window corresponding to a template have been proposed. Some of these methods will be described in brief. For example, if a standard image is one image out of stereoscopic images and a reference image is the other image thereof, and the cameras which imaged the respective images are disposed in parallel as described above, the standard image and the reference image are disposed appropriately in parallel. Then a corresponding point on the reference image is assumed to be at a same height position as the target point on the standard image, so the correlation values with the template can be determined only for windows located at this height position. If the standard image and the reference image are disposed approximately in parallel, and parallax between the standard image and the reference image is to some extend known, the range of setting windows can be further limited. If the range of setting windows can be limited like this, the number of windows for determining a correlation value with the template is suppressed, hence a corresponding window can be searched in a short time.

Another method is a search method based on a multiple resolution strategy. According to this method, the resolution of the standard image and that of the reference image are decreased once, that is the number of pixels is decreased. Then the correlation value is computed in this state, and coordinates where the correlation value with respect to the target point reach the peak are determined. Then the resolution is returned to the original value, and the corresponding point search is performed in the window setting area, which is restricted to the area around the coordinates determined with the low resolution images. If the resolutions of the standard image and reference image are low, a correlation value can be determined in a short time, since information of the image pattern has been decreased. The coordinates where the correlation value peaks at the original resolution must exist in an area near the coordinates where the correlation value peaks at low resolution which was determined like this. Since the range where a corresponding window exists is determined in a short time in this way, the correponding window can also be searched in a short time. In this method, a plurality of low resolution images may be created in steps, so that the search range is gradually narrowed down.

Now concrete methods for calculating correlation values will be described. As functions for determining correlation values, the SAD (Sum of Absolute Difference) method, the SSD (Sum of Squared Difference) method, and the NCC (Normalize Cross Correlation) method among others are known. The SAD method, for example, is a function for determining the sum of absolute values of the brightness value of the template and that of the window, and a correlation value of each window is determined by this function. A method for computing a correlation value, which is more robust than the above mentioned methods, such as the SAD method, is also available. In concrete terms, this method for computing a correlation value is a method for computing a degree of similarity using signals having only a phase component where the amplitude component is suppressed, in the frequency decomposition signals of the image pattern. This method for computing a correlation value is hardly influenced by the difference of imaging conditions between the left camera and the right camera in the stereo image and noise, and can implement robust computation of a correlation value. As a method for calculating a frequency decomposition signal of an image pattern, a Fast Fourier Transform (FFT), a Discrete Fourier Transform (DFT), a Discrete Cosine Transform (DCT), a Discrete Sine Transform (DST), a wavelet transform and a Hadamard transform, for example, are known. Among these robust methods for computing a correlation value, a phase-only correlation method (hereafter called the POC method) will be described in brief here.

In the POC method as well, a template is set on a standard image, and a window having the same size as the template is set on a reference image. While shifting the window on the reference image, a correlation value (POC value) between the template and each window is calculated, and a window corresponding to the template is determined based on the correlation values. First, two-dimensional Discrete Fourier Transform is performed on the template on the standard image and the window on the reference image, and after being standardized and combined, the two-dimensional inverse Discrete Fourier Transform is performed. Thus the POC value, which is the correlation value, is determined. Since the POC value is discretely determined for each pixel, a correlation value can be determined for each pixel in the windows. In other words, a correlation value is determined for each window in the above mentioned SAD method, but in the POC method, a correlation value for each pixel in the window can be determined as well. Therefore it is easy to narrow down the setting range of the window, and processing to determined corresponding points becomes high-speed. In the case of a robust method for computing a correlation value, such as the POC method, it is not necessary to calculate a correlation value while shifting the window one pixel at a time, as in the case of the SAD method, and the correlation value can be calculated even if the window is shifted by a plurality of pixels. The actual amount of this shift depends on the range where correspondence points can be searched, but normally the shift amount is about a half of a window size. In other words, it is set so that the window after the shift and the window before the shift overlap in an area that has about half of the window size, for example. If it is assumed that the maximum parallax of the standard image and reference image is 128 pixels, the window size is 31×31, and the range that can be searched by the POC method is ±8 pixels from the center of the gravity position of the window, for example, then the window should be shifted 16 pixels at a time in order to search this parallax, hence it is sufficient to set eight windows. In the POC method as well, the above mentioned search method based on a multiple resolution strategy can be used. In the case of this example, eight windows can be set, but if the image is reduced to 1/16 using the search method based on the multiple resolution strategy, it is sufficient to set only one window. Thereby the corresponding points can be searched even more easily.

In addition to the POC method, methods for computing correlation values using signals having only phase components generated by suppressing the amplitude component in the frequency decomposition signals of the image pattern is known. An example is the DCT code-only correlation method (see "Integration of image signal processing and image pattern recognition—DCT code-only correlation and application thereof", Hitoshi Kiya, Faculty of System Design, Tokyo Metropolitan University, Dynamic Image Processing for Real Application, 2007, 2007.3.8-9), and correlation values may be computed using these method.

Figure 2:
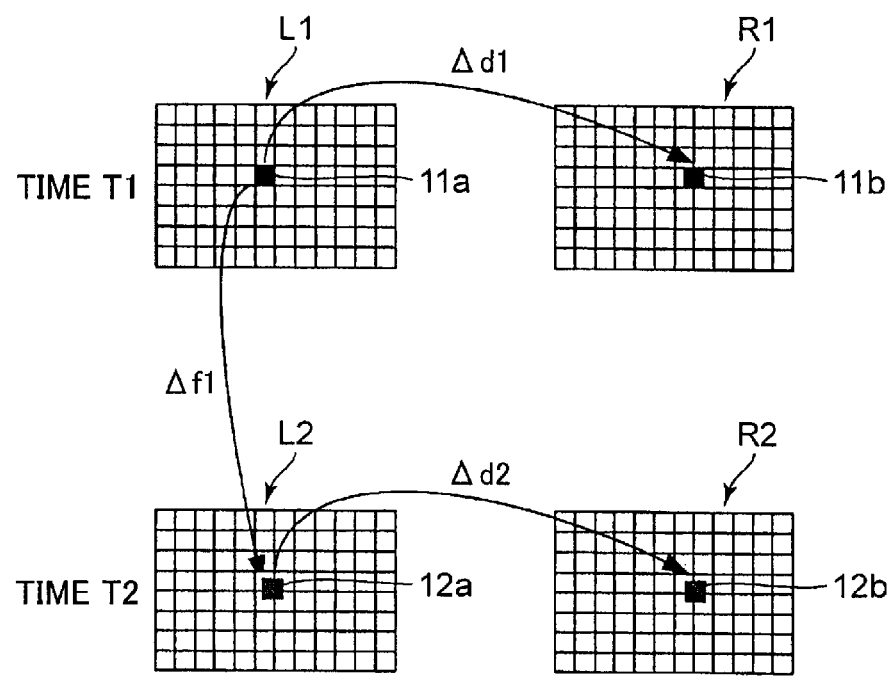
FIG. 2 is a diagram depicting a corresponding point search.

If a corresponding point which corresponds to the target point is determined by the above mentioned corresponding point search method, a new corresponding point search is performed if necessary, using this corresponding point as a target point. By repeating this processing, a point corresponding to an arbitrary target point is determined from a plurality of images in time-series stereo images. Here the corresponding point search in time-series stereo images will be described in brief. FIG. 2 is a diagram for describing the corresponding point search. The images shown in FIG. 2 are images imaged by a stationary stereo camera.

FIG. 2 shows an image L1 and an image R1 which are stereo images imaged at time T1. In the stereo camera having a left camera and right camera pair which imaged these images, it is assumed that each of the cameras is disposed in parallel, in order to simplify description. FIG. 2 also shows an image L2 and an image R2 which are imaged at time T2, which is time after time T1. In the images L1, R1, L2 and R2, each square indicates one pixel. First it is assumed that a point 11$a$ is input in the image L1 at time T1 as a target point (start point). A point 11$b$ in the image R1, which corresponds to this point 11$a$, is determined by the corresponding point search. When the point 11$a$ is a target point, a point 12$a$, which corresponds to the point 111$a$, is determined in the image L2 at time T2 by the corresponding point search. Then using this point 12$a$ as a target point, a point 12$b$, which corresponds to this point, is determined in the image R2 at time T2 by the corresponding point search. Each of the points 11$a$, 11$b$, 12$a$ and 12$b$ is an actual point, but is illustrated with a same size as a pixel in FIG. 2 to be recognized easily.

It is assumed that the coordinates of the point 11$a$ are (p1x, p1y), coordinates of the point 11$b$ are (q1x, q1y), coordinates of the point 12$a$ are (p2x, p2y), and coordinates of the point 12$b$ are (q2x, q2y). The vertical direction of the drawing is the Y direction of each image, and the horizontal direction thereof is the X direction of each image. Since each of the cameras is disposed in parallel, as mentioned above, the Y coordinate of the point 11$a$ and that of the point 11$b$ are the same, and the Y coordinate of the point 12$a$ and that of the point 12$b$ are the same.

First $\Delta d1$, which is a vector representing a parallax of the images L1 and R1, is determined by the coordinates of the point 11$a$ and the point 11$b$, which is determined based on the point 11$a$. In concrete terms, $\Delta d1$ is (q1x−p1x, 0). Also $\Delta f1$, which is vector representing motion in the images L1 and L2, is determined by the coordinates of the point 11$a$ and the point 12$a$, which is determined based on the point 11$a$. In concrete terms, $\Delta f1$ is (p2x−p1x, p2y−p1y). Also $\Delta d2$, which is a vector representing a parallax of the images at time T2, is determined by the coordinates of the point 12a and the point 12b, which is determined based on the point 12a. In concrete terms, Δd2 is (q2x−p2x, 0).

Based on Δd1, the distance D1 in the depth direction of an image obtained from the images at time T1 is determined. Here the distance D1 is a coordinate in a direction perpendicular to the page face in FIG. 2, and this coordinate is regarded as the Z coordinate. If the focal length of each of the cameras of the stereo camera which imaged the images L1, R1, L2 and R2 is f and a base length between each of the cameras is B, then D1 is given by Expression 1. In Expression 1, Δd1 is a magnitude of the vector.

$$D1=fB/\Delta d1 \quad (1)$$

In the same manner, the distance D2 in the depth direction (Z coordinate) obtained from the images at time T2 is given by Expression 2 using Δd2. In Expression 2, Δd2 is a magnitude of the vector.

$$D2=fB/\Delta d2 \quad (2)$$

The three-dimensional coordinates (X1, Y1, Z1) in the points 11a and 11b at time T1 can be expressed as (p1x·D1/f, p1y·D1/f, D1), and the three-dimensional coordinates (X2, Y2, Z2) in the points 12a and 12b at time T2 can be expressed as (p2x·D2/f, p2y·D2/f, D2).

Based on these three-dimensional coordinates (X1, Y1, Z1) and (X2, Y2, Z2), a three-dimensional optical flow can be determined. In concrete terms, the three-dimensional optical flow is a vector expressed by (X2−X1, Y2−Y1, Z2−Z1).

In this way, the three-dimensional image information calculating section 5 calculates the three-dimensional coordinates and the optical flow of arbitrary points in images imaged by the imaging section 1.

From time-series images imaged by a monocular camera, a two-dimensional optical flow can be calculated. In this case, an image imaged by one camera, out of the images by the above mentioned stereo camera, is considered. For example, the images L1 and L2 are obtained, the point 12a corresponding to the point 11a is searched and determined, and the two-dimensional optical flow is determined based on the points 11a and 12a. In other words, the two-dimensional optical flow is expressed as Δf1, mentioned above. If the imaging section 1 is a monocular camera, the three-dimensional image information calculating section 5 calculates, in addition to the two-dimensional optical flow, the three-dimensional image information based on the measured values of an apparatus which can perform three-dimensional measurement.

The three-dimensional image information calculating section 5 may calculate the three-dimensional image information using a method other than the above mentioned method.

The stationary body area extracting section 6 extracts a stationary body area in each image based on the three-dimensional coordinates, the two-dimensional optical flow, and the three-dimensional optical flow, which are calculated by the three-dimensional image information calculating section 5. Here a stationary body refers to an actual stationary object, such as a traffic light, a road surface, a crosswalk and a wall, for example, and does not refer to a still object on an image. Since the imaging section 1 is installed in a vehicle which is a moving body, the imaging section 1 itself is moving. This means that the traffic light, the road surface, the crosswalk and the wall are moving on the time-series images. A stationary body area here refers to a range where the stationary body occupies in the image. There are some publically known technologies available as methods for extracting a stationary body area, which is not fixed on the screen but is not actually moving, from an image. Using these methods, the stationary body area extracting section 6 extracts a stationary body area from the image.

First a method for extracting a stationary body area using a vanishing point of motion, for example, will be described. Here a vanishing point of motion refers to a point where a straight line extending an optical flow in each pixel of the image intersects. This vanishing point is determined according to the moving direction of an object on the image. In other words, in a case of a camera moving in a same direction or a case of a camera that is fixed, a same object is moving in a same direction, hence a vanishing point of this object exists. Stationary body areas are stationary, hence vanishing points of all the stationary body areas are a same point (see "A moving object recognition method by principal component analysis"), Special Interest Group Technical Reports of IPS—Computer Vision and Image Media, Vol. 1996, No. 31, 1995, CVIM-099, Document No. IPSJ—CVIM 95099008). In other words, the straight lines extending an optical flow on a point constituting any of a traffic light, road surface, crosswalk and wall intersect at a same point. Most of the images imaged by the imaging section 1 may be stationary body areas. Therefore it is expected that a vanishing point of the highest number of optical flows is a vanish point of the stationary body area. In other words, out of the vanishing points determined from the image, a vanishing point of the highest number of pixels is regarded as a vanishing point of the stationary body area, and the stationary body area is extracted from the extended optical flows, which intersect at this vanishing point. Since the optical flow has been calculated by the three-dimensional image information calculating section 5, it is unnecessary to calculate the optical flow from scratch in order to determine the vanishing point, hence the vanishing point can be calculated easily.

Stationary body areas may be extracted by detecting stationary bodies of which presence is expected, such as a traffic light, a traffic sign and a sign board, that is, landmarks by pattern recognition or template matching. In pattern recognition, a landmark such as a traffic light is learned and stored by the processing section 2 in advance, whereby the traffic light, which is a stationary body area, is detected from the image using such a method as an SVM (Support Vector Machine) and an AdaBoost algorithm. In template matching as well, a template image of a landmark such as a traffic light is provided in advance, and is stored in a storage unit of the processing section 2. By searching an area of which correlation value with the template image is high in the image, just like the above mentioned corresponding point search, a landmark such as a traffic light is extracted.

Figure 3A:
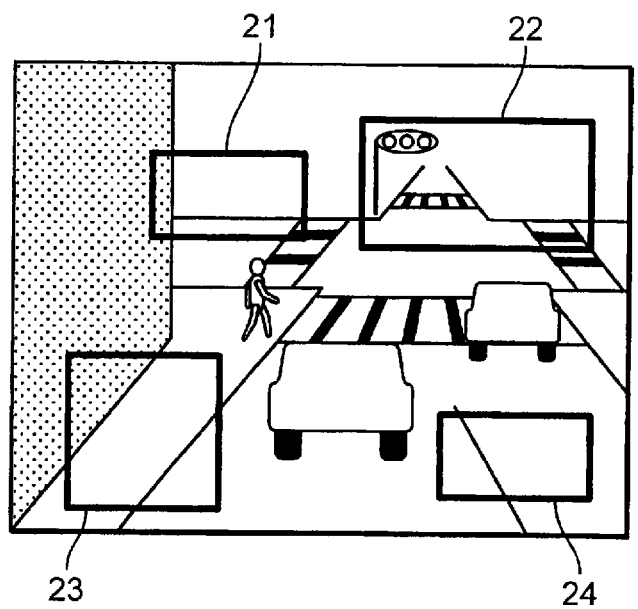
FIG. 3A shows a state of selecting stationary body areas in an image at time T.
Figure 3B:
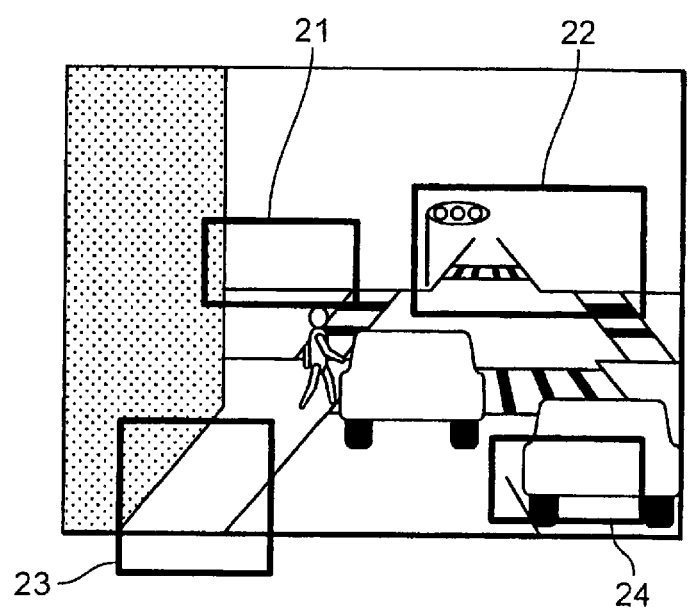
FIG. 3B shows a state of selecting stationary body areas in an image at time T+Δt.

Instead of providing and storing information on objects in a stationary body area in advance, like the case of pattern recognition and template matching, stationary areas may be selected by an operator who is viewing an image imaged by the image section 1. FIG. 3 are diagrams depicting the case of an operator selecting stationary areas, where FIG. 3A shows a state of selecting stationary body areas in an image at time T, and FIG. 3B shows a state of selecting stationary body areas in an image at time T+Δt. The operator, for example, displays an imaged image on the display device 3, and operates a mouse, which is the input section 4, so as to select a stationary body area in the image displayed on the display device 3. For example, as FIG. 3A shows, the operator sets, from the image displayed on the display device 3, the stationary body area 21 which includes the area near the boundary between the road and the side walk and the wall surface, the stationary body area 22 which includes the traffic light and the road surface, such as a crosswalk, the stationary body areae 23 which includes the side walk, the road surface and the wall surface, and the stationary body area 24 which includes the road surface and the traffic lane formed on the road surface. The operation of setting the stationary body areas 21, 22, 23 and 24 may be performed for all the images that are imaged, or may be performed on one image, for example, so that this image is used as the standard image, and the stationary body areas of the other images are determined by tracking based on the corresponding point search. For example, FIG. 3A shows an image at time T, and FIG. 3B shows an image at time T+Δt, that is, FIG. 3B shows an image which was imaged at Δt later from the image in FIG. 3A. Since the moving body on which the imaging section 1 is installed is moving, the positions of the stationary body areas 21, 22, 23 and 24 are different in FIG. 3A and FIG. 3B. The stationary body area 24 cannot be searched by the corresponding point search, since a vehicle, which is a moving body, entered in FIG. 3B. In such a case, the stationary body area 24 is excluded from the candidates of the stationary body areas. As a method of inputting a stationary body area first and tracking this stationary body area thereafter, not only the method based on the corresponding point search, but also a method of calculating optical flow, such as the Lucas-Kanade method, is available.

The stationary body area extracting section 6 may directly extract stationary body areas in the image, as mentioned above, or may extract moving areas out of the image and then extract other areas as the stationary body areas. Here a moving body refers to an object actually moving, such as a vehicle, motorcycle, bicycle and pedestrian. A moving area refers to a range occupied by a moving object in the image. The stationary body area extracting section 6 may extract a moving body area by detecting the moving body area based on the pattern recognition or template matching. The stationary body area extracting section 6 may extract a movin body area using a method according to Japanese Patent Application Laid-Open No. H7-334800. The method according to Japanese Patent Application Laid-Open No. H7-334800 is a method for detecting a vehicle in an image based on edge distribution and symmetry in the image. According to this method, it may be difficult to detect a pedestrian. The stationary body area extracting section 6 may extract moving body areas by these methods, and extract areas other than the moving body areas in the image, as stationary body areas.

The distance information and optical flow may be determined based on the stereo time-series images imaged by the imaging section 1 installed in the moving body, and be corrected using the speed of the imaging section 1, so that the stationary bodies and moving bodies in the image are discerned (e.g. see Japanese Patent Application Laid-Open No. 2006-134035). The stationary body area extracting section 6 may extract the stationary body areas using this method.

The stationary body area extracting section 6 need not extract all the stationary body areas in the image. A stationary body area need not be an area having a surface, but may be a point (pixel). Some methods for extracting stationary body areas have been described, but the stationary area extracting section 6 may extract stationary body areas using one of these methods, or may extract stationary body areas selectively using these methods. For example, a pedestrian cannot be detected using the method according to Japanese Patent Application Laid-Open No. H7-334800, so the stationary body area extracting section 6 first uses this method. And if the stationary body area extracting section 6 cannot extract moving body areas, the stationary body area extracting section 6 may extract moving body areas using another method, and then extract other areas of the image as the stationary body areas. The stationary body area extracting section 6 may normally extract stationary body areas by pattern recognition or template matching using landmarks, and extract stationary body areas by another method if the provided landmarks do not exist in the image. The stationary body area extracting section 6 may extract stationary body areas by a method other than the above mentioned methods.

If the image integration unit 100 is used as a driving recorder for investigating the cause of an automobile accident, such as a rear end collision, it is important to display not only the change of the moving body in time-series positions, but also the traffic lights in relation to this change. Hence it is preferable to extract information on which one of red, green and yellow lamps are ON in the traffic light along with the time related information. For this, it is preferable that the stationary body area extracting-section (traffic light extraction section) 6 extracts the stationary body area of the traffic light in advance.

The integrating section 7 integrates each of the time-series images by matching the stationary body areas extracted by the stationary body area extracting section 6 in each of the time-series images. This means that the stationary body areas in the integrated image do not change, but a same object of a moving area may exist at a plurality of locations. In other words, a location of the moving body changes depending on time, so the number of moving bodies according to the number of time-series images (number of frames) which were integrated may exist in the integrated image.

In concrete terms, the integrating section 7 selects arbitrary three points in a stationary body area in a standard image extracted by the stationary body area extracting unit 6. It is assumed that these three points are not on a same straight line on the three-dimensional coordinates. The three-dimensional coordinates of each point (pixel) in the image have already been calculated by the three-dimensional image information calculating section 5. Since the three-dimensional coordinates of these three points have also been calculated by the three-dimensional image information calculating section 5, the integrating section 7 can easily select three points which are not on a same straight line. In the case of integrating this image and an image in the next frame, the integrating section 7 must know the points in the image in the next frame, which correspond to these three points. For example, the integrating section 7 may calculate the corresponding three points using the above mentioned corresponding point search method. The integrating section 7 may determine the corresponding three points using the computing method for determining an optical flow, such as the Lucas-Kaneda method. To integrate an image at time T and an image at time T+Δt, for example, the integrating section 7 selects three points which are not on a same straight line in a stationary body area in the image at time T, and determines the corresponding points in the image at time T+Δt. Then the integrating section 7 calculates a rotational component and a translational component which are required for the coordinate transform of the three-dimensional coordinates of the three points at time T+Δt, in order to match the surface formed by the three points at time T+Δt with the surface formed by the three points at time T. In other words, the integrating section 7 matches the normal vector on the surface formed by the three points at time T+Δt with the normal vector on the surface formed by the three points at time T, and calculates a rotational component and a translational component for making one of the three points at time T+Δt with one of the three points at time T, or for matching a center of gravity of the three points at time T+Δt with a center of gravity of the three points at time T. By transforming each pixel in the image at time T+Δt by the calculated rotational component and translational component, the integrating section 7 can match the stationary body area in the image at time T+Δt with the stationary body area in the image at time T. Images do not match each other in the moving body areas, so two moving bodies exist in the integrated image. If the moving speed of the moving body is slow, however, only one of these moving bodies may exist in the integrated image.

It is preferable that the three points selected in the standard image are distant from one another in the three-dimensional coordinates. Then the stationary body areas match, not in a local area, but in a wide range of the stationary body areas, that is, a match of the stationary body areas becomes more certain, and an integrated image at high precision can be obtained. However as the distance between each of the selected three points increases, the possibility of the existence of the points corresponding to these three points in each of the time-series images decreases. Hence the distance between each of the selected three points should be set to an appropriate value according to the image to be created by the integration. In concrete terms, if an integrated image must have high precision, it is preferable that the area of a triangle formed by connecting these selected three points is at least 0.8 of the maximum areas of the triangle which can be formed by three points in the image. Further it is preferable that the sum of the three sides of the triangle formed by connecting these selected three points is at least 0.8 of the maximum sum of the three sides of a triangle which can be formed by three points in the image. If both precision and easy selection are considered, it is preferable that the area of the triangle formed by connecting these selected three points is at least 0.6 of the maximum area of a triangle which can be formed by three points in the image. Moreover it is preferable that the sum of the three sides of the triangle formed by connecting these selected three points is at least 0.6 of the maximum sum of the three sides of a triangle which can be formed by three points in the image. If an integrated image having minimum precision is obtained when the contrast of each of the time-series images is low and the number of corresponding points is few, it is preferable that the area of the triangle formed by connecting these selected three points is at least 0.4 of the maximum area of a triangle which can be formed by three points in the image. Further, it is preferable that the sum of the three sides of the triangle formed by connecting these selected three points is at least 0.4 of the maximum sum of three sides of a triangle which can be formed by three points in the image.

The three points for matching the stationary body areas may be regarded as a set of three points, and a plurality of sets may be set. Then the integrating unit 7 can calculate the above mentioned rotational component and translational component using these plurality of sets based on the least square method. Thereby the integrating section 7 can determine a more stable solution (rotational component and translational component), and the precision of the image integration increases.

As a method for matching the stationary body areas, a method of using an ICP (Iterative Closest Points) algorithm is available. In concrete terms, regarding the three-dimensional coordinates of a plurality of arbitrary points in a stationary body area in a standard image extracted by the stationary body area extracting section 6 as initial values, the integrating section 7 determines points in an image to be integrated (image in the next frame) which correspond to these plurality of points, using the corresponding point search method or the Lucas-Kaneda method. By using the ICP (Iterative Closest Points) algorithm, the integrating section 7 can align the respective plurality of points of these two images. In other words, the integrating section 7 can calculate a rotational component and a translational component required for coordinate transform of a plurality of points on the three-dimensional coordinates at time T+Δt, in order to match the corresponding plurality of points in the stationary body area on the three-dimensional coordinates at time T+Δt with the plurality of points in the stationary body area in the standard image at time T. By transforming each pixel in the image at time T+Δt using the calculated rotational component and translational component, the integrating section 7 can match and align the stationary body area in the image at time T+Δt with the stationary body area in the image at time T. A moving body areas in the image at time T and a moving body area at time T+Δt do not match, so each moving body exists at two locations in the integrated image. If the moving speed of the moving body is slow, only one of these moving bodies may exist in the integrated image.

By using the ICP algorithm, the integrating section 7 can perform robust alignment of a plurality of corresponding points without being influenced by noise very much.

Integration of the image at time T and the image at time T+Δt was described above, but the integrating section 7 can further integrate more images. For example, the integrating section 7 can integrate images at time T+2×Δt, time T+3×Δt . . . as well to the image at time T. In the case of integrating a plurality of time-series images like this, points corresponding to the selected three points for matching the stationary body areas may no longer exist in the image. Therefore it is preferable that these three points are changed (updated) according to each of the time-series images.

If a traffic light exists in each of the time-series images to be integrated, the integrating section 7 can regard a lamp color of a traffic light in one of the frames as the lamp color of the traffic light in the integrated image. For example, a color of a lamp of which brightness value is highest among the lamps of the traffic light in all the integrated frames can be regarded as a lamp color of the traffic light in the integrated image.

The display device 3 is a CRT (Cathode Ray Tube) display, an LCD (Liquid Crystal Display), an organic EL (Electro-Luminescence) display and a plasma display, and the above mentioned integrated image and images before integration are displayed.

The input section 4 is a keyboard and a mouse, for example, and is used for inputting the operational instructions of the image integration unit 100 and selecting the stationary body areas.

Figure 4:
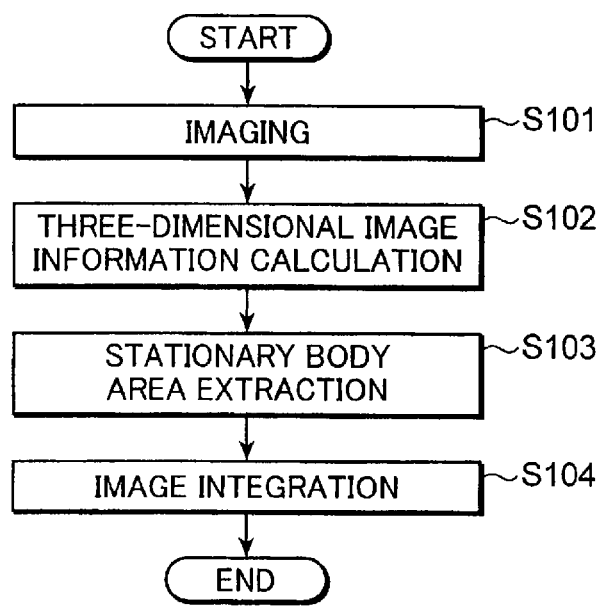
FIG. 4 is a flow chart depicting the operation of the image integration unit according to an embodiment of the present invention.
Figure 5:
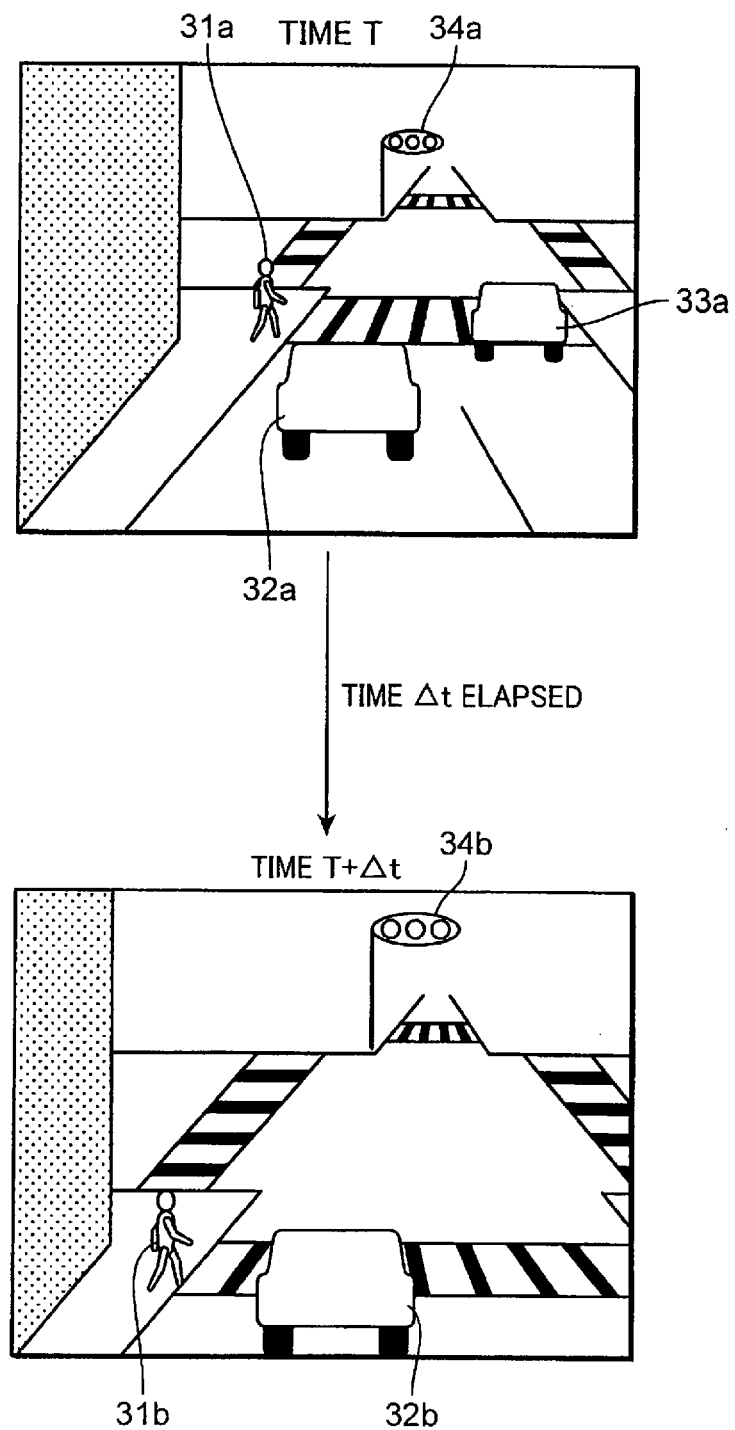
FIG. 5 are diagrams depicting time-series images imaged by the imaging unit according to an embodiment of the present invention.

An operation of the image integration unit 100 according to an embodiment of the present invention will now be described with reference to FIG. 4. FIG. 4 is a flow chart depicting the operation of the image integration unit 100 according to an embodiment of the present invention. The imaging section 1 installed in a vehicle (moving body) is installed so that the lens faces the traveling direction of the vehicle, for example, and repeats imaging at any time (S101). It is preferable that the imaging section 1 is a stereo camera constituted by a pair of a left camera and a right camera, and this pair of cameras simultaneously image images and obtain time-series stereo images. If the imaging section 1 is a monocular camera, an apparatus which can perform the three-dimensional measurement is performing measurement. Here, an example of the time-series images will be described. FIG. 5 are diagrams depicting time-series images imaged by the imaging unit according to an embodiment of the present invention. In FIG. 5, the upper drawing is an image which is imaged at time T, and the lower drawing is an image which is imaged at time T+Δt, which is At later than time T. In the image at time T, a traffic light 34a which is a stationary body, and a pedestrian 31a, a vehicle 32a and a vehicle 33a, which are moving bodies, exist. In the image at time T+Δt, a traffic light 34b which is a stationary body, and a pedestrian 31*b* and a vehicle 32*b*, which are moving bodies, exist. As these images show, the traffic light 34*a* and the traffic light 34*b* are images of a same traffic light, and the reason why the traffic light 34*b* is displayed larger than the traffic light 34*a* is because the imaging section 1 has approached closer to the traffic light. The pedestrian 31*a* and the pedestrian 31*b* are images of a same pedestrian, and the pedestrian 31*b* is closer to the roadway (right direction in FIG. 5). The vehicle 32*a* and the vehicle 32*b* are images of a same vehicle, and the vehicle 32*b* is closer to the traffic light. The reason why the vehicle 32*b* is displayed larger than the vehicle 32*a* is because the imaging section 1 has approached closer to this vehicle. A vehicle the same as the vehicle 32*a* is not displayed in the image at time T+Δt. Since the vehicle 32*a* is moving in a direction away from the traffic light 34*a*, this vehicle has moved outside the range of the image at time T+Δt.

The image imaged by the imaging section 1 is sent to the three-dimensional image information calculating section 5. The three-dimensional image information calculating section 5 calculates the three-dimensional image information at each point in each image (S102). In concrete terms, the three dimensional image information calculating section 5 calculates the two-dimensional optical flow, three-dimensional coordinates and three-dimensional optical flow of each point.

Figure 6:
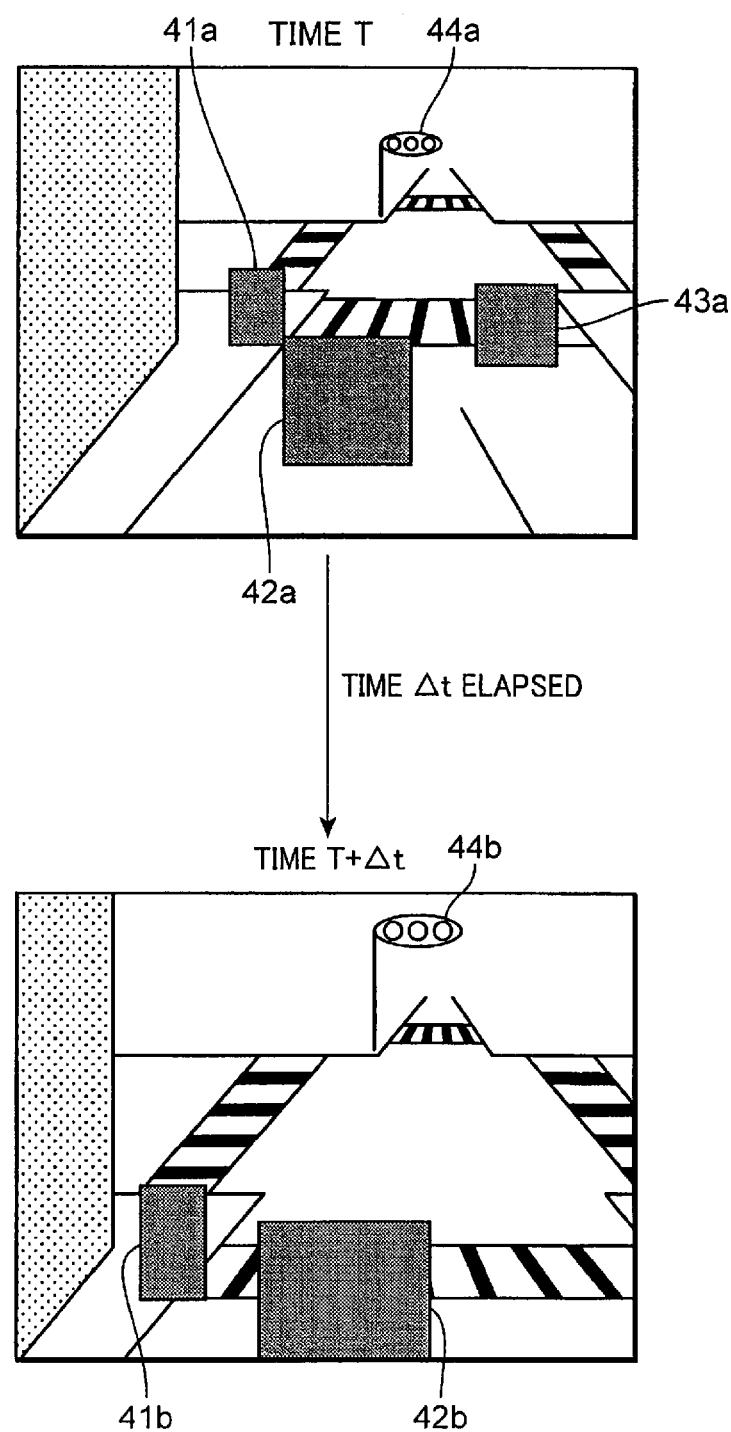
FIG. 6 are diagrams depicting time-series images in a state of extracting stationary body areas according to an embodiment of the present invention.

Based on the three-dimensional image information from the three-dimensional image information calculating section 5, the stationary body area extracting section 6 extracts a stationary body area in each image (S103). In this case, the operator may directly instruct a stationary body area in the image via the input section 4 while viewing each image displayed on the display device 3. Here, an example of time-series images in a state of extracting the stationary body areas will be described. FIG. 6 are diagrams depicting time-series images in a state of extracting stationary body areas according to an embodiment of the present invention. In FIG. 6, the upper drawing is an image which is imaged at time T, and the lower drawing is an image which is imaged at time T+Δt that is Δt after time T. In the images shown in FIG. 6, the stationary body areas have been extracted based on the images in FIG. 5. In the image at time T, the traffic light 44*a*, which is a stationary body, is displayed, but the pedestrian and the vehicle, which are moving bodies, are displayed as moving body areas 41*a*, 42*a* and 43*a* which are filled. In FIG. 6, the displayed image is the stationary body area. In the image at time T+Δt, the traffic light 44*b*, which is a stationary body, is displayed, but the pedestrian and the vehicle, which are moving bodies, are displayed as the moving body areas 41*b* and 42*b* which are filled.

Then the integrating section 7 calculates a rotational component and a translational component which transform for the image at time T+Δt, so that the stationary body area of each of the images extracted by the stationary body area extracting section 6 matches, then transforms the image at time T+Δt, and superimposes the image at time T and the image at time T+Δt to integrate each of the images (S104). In concrete terms, the integrating section 7 selects three or a plurality of points out of the stationary body area in the standard image extracted by the stationary body area extraction unit 6, and searches three points corresponding to these three points, or a plurality of points corresponding to these plurality of points in the image to be integrated with the standard image. Then the integrating unit 7 calculates a rotational component and a translational component required for coordinate transform, so as to match the surface formed by the three points in the standard image with the surface formed by three points corresponding the above-described three points. In the case of selecting a plurality of points, the integrating section 7 calculates the components for transform by using the ICP algorithm. The integrating section 7 transforms the image to be integrated with the standard image, using the components for transform, and integrates the transformed image and the standard image.

Figure 7:
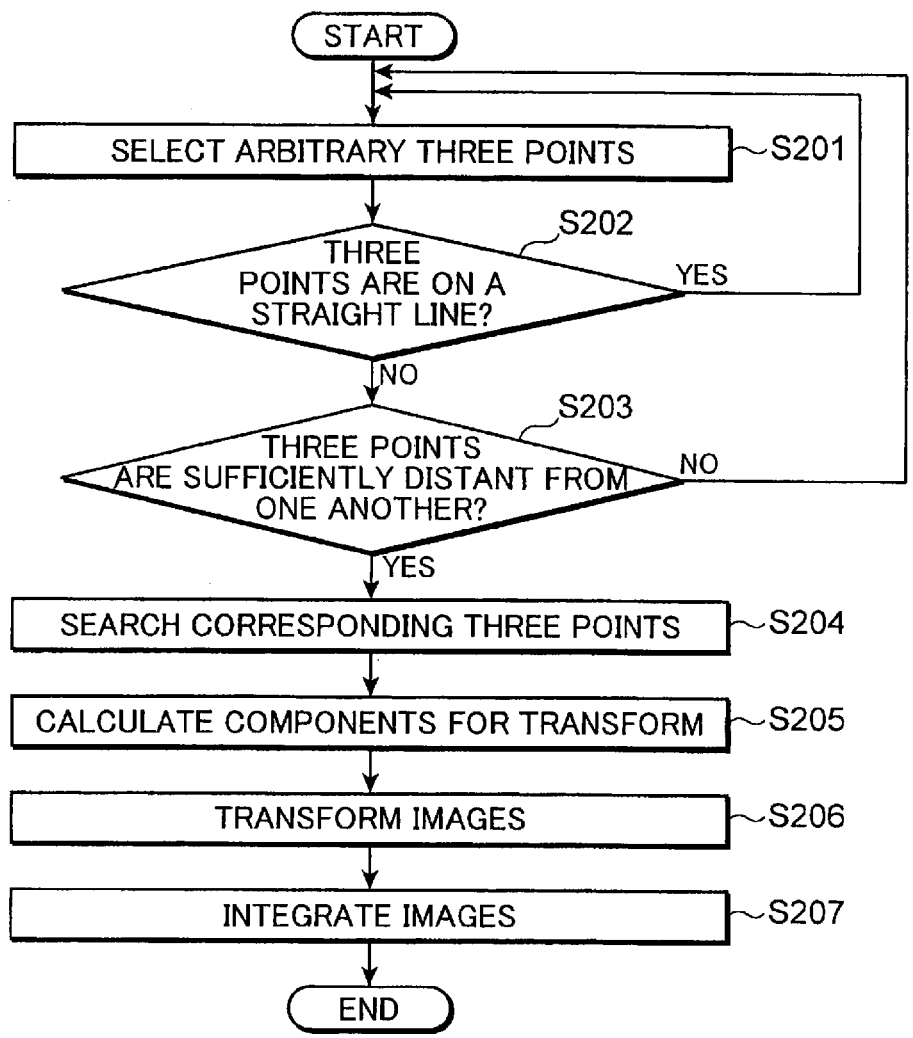
FIG. 7 is a flow chart depicting an operation of an integrating section according to an embodiment of the present invention.

Now operation of the integrating section 7 in the case of calculating a rotational component and a translational component (components for transform) required for coordinate transform using three points in the stationary body area will be described with reference to FIG. 7. FIG. 7 is a flow chart depicting an operation of the integrating section according to an embodiment of the present invention. In concrete terms, FIG. 7 is a flow chart depicting an operation of the integrating section 7 in the case of calculating the rotational component and the translational component (components for transform) required for the coordinate transform using three points in the stationary body area. Here a case of requiring an integrated image at high precision will be described. First the integrating section 7 selects three arbitrary points in the stationary body area in the standard image extracted by the stationary body area extracting section 6 (S201). Then the integrating section 7 determines whether these three points are on a straight line in the three dimensional coordinates (S202). If these three points are on a straight line, the integrating section 7 returns to step S201, and reselects an arbitrary three points. In this case, the integrating section 7 may change only one point. If the three points are not on a stright line in step S202, the integrating section 7 determines whether these three points are sufficiently distant from one another, and whether each of the distances is appropriate. In concrete terms, it is determined whether the area of a triangle formed by connecting these three points is at least 0.8 of the maximum area of a triangle which can be formed by connecting three points in the image. If the area of the triangle formed by connecting the three points in the image is not at least 0.8 of the maximum area of a triangle which can be formed by connecting the three points in the image, the three points are not sufficiently distant from one another, so the integrating section 7 returns to step S201, and reselects an arbitrary three points. If the area of the triangle formed by connecting the three points in the image is at least 0.8 of the maximum area of a triangle which can be formed by connecting three points in the image, the three points are sufficiently distant from one another, so the integrating section 7 searches three points corresponding to these three points in the image to be integrated with the image (S204). Then the integrating section 7 calculates a rotational component and a translation component (components for transform) required for coordinate transform, so as to match the surface formed by the three points in the standard image with the surface formed by the corresponding three points (step S205). Then the integrating section 7 transforms the image to be integrated with the standard image using the components for transform (step S206), and integrates the transformed image and the standard image (step S207). A lamp color of the traffic light is regarded as a color of a lamp of which brightness value is highest among the lamps of the traffic light in each of the images.

Figure 8A:
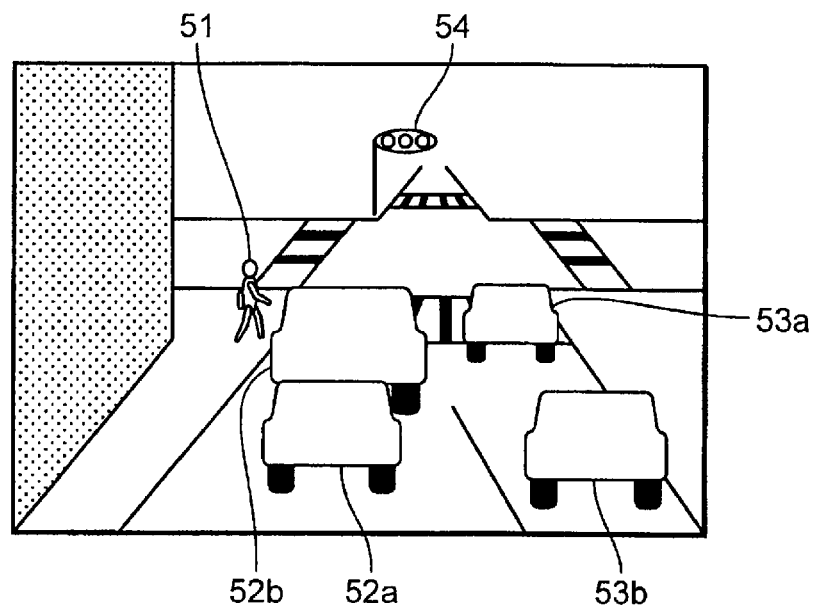
FIG. 8A shows an integrated image of the images imaged by the imaging section.
Figure 8B:
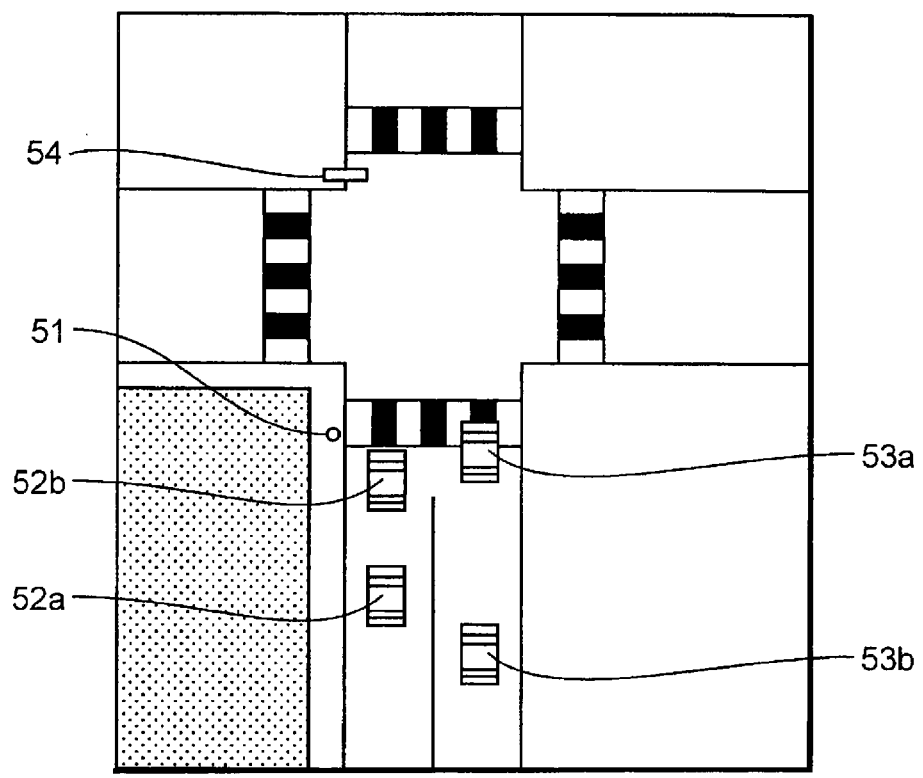
FIG. 8B shows an image generated by transforming the integrated image into a bird's eye view.

The display device 3 displays the integrated image. An example of the integrated image will now be described. FIG. 8 are diagrams depicting integrated images according to an embodiment of the present invention, where FIG. 8A shows an integrated image of the images imaged by the imaging section, and FIG. 8B shows an image generated by transforming the integrated image into a bird's eye view. As FIG. 8A shows, the stationary body area including the traffic light 54 in both of the images are matched and superimposed, but the vehicle 52a, 52b and the vehicle 53a, 53b, which are moving bodies, exist in two locations respectively. In other words, the vehicle 52a and the vehicle 52b are displays of a same vehicle, where the vehicle 52a is one imaged at time T, and the vehicle 52b is one imaged at time T+Δt. The vehicle 53a and the vehicle 53b are displays of a same vehicle, where the vehicle 53a is one imaged at time T, and the vehicle 53b is one imaged at time T+Δt. The pedestrian 51 is also a moving body, but the moving speed thereof is slow compared with the vehicles, and the pedestrian 51 hardly moves during Δt, therefore the pedestrian 51 is displayed in the superimposed state. Since this integrating image has three-dimensional image information, this integrated image can be transformed into an image viewed from a different angle. In concrete terms, the display can be the bird's eye view as shown in FIG. 8B. If this bird's eye view display is used, the difference of speed of the vehicle 52a, 52b and the vehicle 53a, 53b, for example, can be viewed quite well. In this case, the distance between the vehicle 53a and the vehicle 53b is longer than the distance between the vehicle 52a and the vehicle 52b. Therefore the speed of the vehicle 53a, 53b is faster than that of the vehicle 52a, 52b.

In this way, in the integrated image obtained by the image integration unit according to this embodiment, the time-series images are matched using the stationary body areas, hence movement of a moving body is easily recognized, and the operating state of a vehicle, for example, can be seen at first glance. Therefore such a situation as an accident can be easily analyzed by using this integrated image. Furthermore, the imaging section of the image integration unit according to this embodiment can be installed in a vehicle and used in this state, which means that the imaging location is not restricted.

The present description discloses various modes of the technologies, as mentioned above, and major technologies thereof will be summarized herein below.

An image integration unit according to an aspect of the present invention includes: an imaging section which is installed in a moving body and which images a plurality of time-series images at different times; a three-dimensional image information calculating section which calculates three-dimensional image information in each of the time-series images based on the time-series images imaged by the imaging section; a stationary body area extracting section which extracts stationary body areas in each of the time-series images based on the three-dimensional image information; and an integrating section which calculates the corresponding stationary body areas between the time-series images from each of the stationary body areas extracted in each of the time-series images, and matches the corresponding stationary body areas to integrate the time-series images.

Since the image integration unit integrates a plurality of images at different times based on stationary body areas in these images like this, the images can be integrated accurately. Another effect of this image integration unit is that an integrated image, by which motion of the moving body can be known at a glance, can be obtained.

In this image integration unit, it is preferable that the imaging section can obtain a pair of a left stereo image and a right stereo image, each of the plurality of time-series images is the stereo image, and the three-dimensional image information calculating section calculates three-dimensional image information in each of the time-series images using the stereo images.

Since the image integration unit obtains three-dimensional image information using stereo images like this, three-dimensional image information at high precision can be obtained.

In this image integration unit, it is preferable that the integrating section selects a plurality of arbitrary points in one of the corresponding stationary body areas, calculates a plurality of points corresponding to the plurality of arbitrary points in the other of the corresponding stationary body areas, and calculates a rotational component and a translational component for matching the plurality of arbitrary points and the plurality of points corresponding to the plurality of arbitrary points.

The integrating section can easily match the corresponding stationary body areas by using the rotational component and the translational component like this.

In this image integration unit, it is preferable that the plurality of arbitrary points selected in one of the stationary body areas are arbitrary three points, the points to be calculated in the other of the corresponding stationary body areas are three points corresponding to the arbitrary three points, and the rotational component and the translational component are calculated so that the arbitrary three points and the three points corresponding to the arbitrary three points match.

Since the integrating section can calculate the rotational component and the translational component using a few points like this, processing speed is fast.

In this image integration unit, it is preferable that the arbitrary three points are changed according to each of the time-series images to be integrated.

Due to this, the three points are selected out of the points which actually exist in the image to be integrated. Hence even if a plurality of images are integrated and the number of images increases as occasion demands, the image integration unit can integrate the images with certainty.

In this image integration unit, it is preferable that the three points are selected such that an area of a triangle formed by connecting the arbitrary three points has at least a predetermined ratio of a maximum area of a triangle formed by connecting the three points.

Due to this, a certain distance between the respective points is ensured. If the three points are too close to one another, the integrating section determines the matching of the stationary body areas in a local portion, but if each point is distant from one another, matching of the stationary body areas can be determined more accurately.

In this image integration unit, it is preferable that the three points are selected such that a sum of three sides of a triangle formed by connecting the arbitrary three points has at least a predetermined ratio of a maximum sum of three sides of a triangle formed by connecting the three points.

Due to this, a certain distance between the respective points is ensured. If the three points are too close to one another, the integrating section determines matching of the stationary body areas in a local portion, but if each point is distant from one another, matching of the stationary body areas can be determined more accurately.

In this image integration unit, it is preferable that the integrating section calculates the rotational component and the translational component for matching the plurality of arbitrary points and the plurality of points corresponding to the plurality of arbitrary points, using an ICP algorithm.

If the ICP algorithm is used like this, the integrating section can perform robust alignment, hardly influenced by noise, for the plurality of corresponding points.

In this image integration unit, it is preferable that the stationary body area extracting section extracts stationary body areas using a vanishing point of motion.

The stationary body area extracting section can easily extract a stationary body area by using a vanishing point of motion like this. In order to determine a vanishing point of motion, an optical flow must be determined, but the three-dimensional image information calculating unit has already calculated the optical flow, so it is unnecessary to calculate the optical flow from scratch.

In this image integration unit, it is preferable that the stationary body area extracting section extracts stationary body areas by pattern recognition or template matching using a landmark.

Due to this, the stationary body area extracting unit can extract a stationary body area by such a simple method as pattern recognition or template matching. Shapes known in advance such as traffic signs, traffic lights or sign boards can be used for the landmarks.

In this image integration unit, it is preferable that the stationary body area extracting section extracts moving body areas in the time-series images, and extracts, as stationary body areas, areas other than the moving body areas in the time-series images.

Due to this, the stationary body area extracting section can extract stationary body areas using a method for extracting moving body areas.

In this image integration unit, it is preferable that the three-dimensional image information calculating section calculates the three-dimensional image information by using corresponding point search between images, and uses, in the corresponding point search, image patterns of windows where frequency decomposition is performed and an amplitude component is suppressed.

If an amplitude component is suppressed from the frequency components like this in the corresponding point search used by the three-dimensional image information calculating section, robust corresponding point search becomes possible, since the influence of brightness different among images and noise is decreased.

In this image integration unit, it is preferable that the frequency decomposition is one of FFT, DFT, DCT, DST, wavelet transform and Hadamard transform.

Since the three-dimensional image information calculating section performs frequency decomposition using a method which is generally used and which has already been established like this, frequency decomposition can be performed with certainty.

In this image integration unit, it is preferable that a phase-only correlation method is used for the corresponding point search.

By using the phase-only correlation method like this, the three-dimensional image information calculating section can perform corresponding point search at higher precision.

It is preferable that this image integration unit further includes a traffic light extracting section which extracts a traffic light in each of the time-series images, wherein the integrating section regards a lamp color of the extracted traffic light in one of the time-series images, as a lamp color of the extracted traffic light in the image integrated by the integrating section.

Due to this, the operator can judge the specifics of the situation in the integrated image.

In this image integration unit, it is preferable that the integrating section regards a lamp color of the traffic light in an image in which brightness of a lamp of the extracted traffic light is highest, out of the time-series images, as a lamp color of the extracted traffic light in the image integrated by the integrating section.

Due to this, the operator can judge the specifics of the situation in the integrated image.

An image integration method according to another aspect of the present invention includes: an imaging step of imaging a plurality of time-series images at different times while moving; a three-dimensional image information calculating step of calculating three-dimensional image information in each of the time-series images based on the time-series images imaged in the imaging step; a stationary body area extracting step of extracting stationary body areas in each of the time-series images based on the three-dimensional image information calculated in the three-dimensional image information calculating step; and an integrating step of calculating the corresponding stationary body areas between the time-series images from each of the stationary body areas extracted in each of the time-series images, and matching the stationary body areas to integrate the time-series images.

Since a plurality of images at different times are integrated based on stationary body areas in these images like this, the images can be integrated accurately. Another effect of this image integration method is that an integrated image by which motion of the moving body can be known at a glance can be created.

Although the present invention has been described above appropriately and sufficiently through embodiments with reference to the drawings, it should be recognized that those skilled in art can easily make modifications and/or improvements in the above mentioned embodiments. Therefore unless those modifications or improvements made by those skilled in the art depart from the scope of the Claims, the modifications and improvements shall be interpreted as being included in the scope of the Claims.

INDUSTRIAL APPLICABILITY

According to the present invention, an image integration unit and an image integration method for integrating time-series images can be provided.

The invention claimed is:

1. An image integration unit, comprising:
an imaging section which is installed in a moving body and which captures time-series images at different times during movement of the moving body, wherein each of the time-series images includes an image of a stationary body that is immovable and an image of a moving object that is movable relative to the stationary body;
a three-dimensional image information calculating section which calculates three dimensional image information in each of the time-series images based on the time-series images captured by the imaging section;
a stationary body area extracting section which extracts stationary body areas in each of the time-series images based on the three-dimensional image information, wherein each of the stationary body areas corresponds to the image of the stationary body; and
an integrating section which calculates the corresponding stationary body areas between the time-series images from each of the stationary body areas extracted in each of the time-series images, and farms an integrated image of the time-series images by matching the corresponding stationary body areas, such that images of corresponding moving objects between the time-series images appear in different positions in the integrated image thereby representing movement of the moving object relative to the stationary body, the movement being made in an interval between different times at which the time-series images are captured.

2. The image integration unit according to claim 1, wherein the imaging section can obtain a pair of a left stereo image and a right stereo image, each of the plurality of time-series images is the stereo image, and the three-dimensional image information calculating section calculates three-dimensional image information in each of the time-series images using the stereo images.

3. The image integration unit according to claim 1, wherein the integrating section selects a plurality of arbitrary points in one of the corresponding stationary body areas, calculates a plurality of points corresponding to the plurality of arbitrary points in the other of the corresponding stationary body areas, and calculates a rotational component and a translational component for matching the plurality of arbitrary points and the plurality of points corresponding to the plurality of the arbitrary points.

4. The image integration unit according to claim 3, wherein the plurality of arbitrary points selected in one of the stationary body areas are arbitrary three points, the points to be calculated in the other of the corresponding stationary body areas are three points corresponding to the arbitrary three points, and the rotational component and the translational component are calculated so that the arbitrary three points and the three points corresponding to the arbitrary three points match.

5. The image integration unit according to claim 4, wherein the arbitrary three points are changed according to each of the time-series images to be integrated.

6. The image integration unit according to claim 4, wherein the three points are selected such that an area of a triangle formed by connecting the arbitrary three points has at least a predetermined ratio of a maximum area of a triangle formed by connecting the three points.

7. The image integration unit according to claim 4, wherein the three points are selected such that a sum of three sides of a triangle formed by connecting the arbitrary three points has at least a predetermined ratio of a maximum sum of three sides of a triangle formed by connecting the three points.

8. The image integration unit according to claim 3, wherein the integrating section calculates the rotational component and the translational component for matching the plurality of arbitrary points and the plurality of points corresponding to the plurality of arbitrary points, using an iterative closest points algorithm.

9. The image integration unit according to claim 1, wherein the stationary body area extracting section extracts stationary body areas using a vanishing point of motion.

10. The image integration unit according to claim 1, wherein the stationary body area extracting section extracts stationary body areas by pattern recognition or template matching using a landmark.

11. The image integration unit according to claim 1, wherein the stationary body area extracting section extracts moving body areas in the time-series images, and extracts, as stationary body areas, areas other than the moving body areas in the time-series images.

12. The image integration unit according to claim 1, wherein the three-dimensional image information calculating section calculates the three-dimensional image information by using corresponding point search between images, and uses, in the corresponding point search, image patterns of windows where frequency decomposition is performed and an amplitude component is suppressed.

13. The image integration unit according to claim 12, wherein the frequency decomposition is one of FFT, DFT, DCT, DST, wavelet transform and Hadamard transform.

14. The image integration unit according to claim 12, wherein a phase-only correlation method is used for the corresponding point search.

15. The image integration unit according to claim 1, further comprising a traffic light extracting section which extracts a traffic light in each of the time-series images, wherein the integrating section regards a lamp color of the extracted traffic light in one of the time-series images, as a lamp color of the extracted traffic light in the image integrated by the integrating section.

16. The image integration unit according to claim 15, wherein the integrating section regards a lamp color of the traffic light in an image in which brightness of a lamp of the extracted traffic light is highest, out of the time-series images, as a lamp color of the extracted traffic light in the image integrated by the integrating section.

17. An image integration method comprising:

capturing time-series images from a moving body at different times during movement of the moving body, wherein each of the time-series images includes an image of a stationary body that is immovable and an image of a moving object that is movable relative to the stationary body;

calculating three-dimensional image information in each of the time-series images based on the time-series images generated by the capturing of the time-series images;

extracting stationary body areas in each of the time-series images based on the three-dimensional image information, wherein each of the stationary body areas corresponds to the image of the stationary body; and calculating the corresponding stationary body areas between the time-series images from each of the stationary body areas extracted in each of the time-series images, and forming an integrated image of the time-series images by matching the corresponding stationary body areas, such that images of corresponding moving objects between the time-series images appear in different positions in the integrated image thereby representing movement of the moving object relative to the stationary body, the movement being made in an interval between different times at which the time-series images are captured.

18. The image integration unit according to claim 2, wherein the stationary body area extracting section extracts stationary body areas using a vanishing point of motion.

19. The image integration unit according to claim 2, wherein the stationary body area extracting section extracts stationary body areas by pattern recognition or template matching using a landmark.

20. The image integration unit according to claim 2, wherein the stationary body area extracting section extracts moving body areas in the time-series images, and extracts, as stationary body areas, areas other than the moving body areas in the time-series images.

* * * * *